(12) United States Patent
Fujita et al.

(10) Patent No.: US 8,919,887 B2
(45) Date of Patent: Dec. 30, 2014

(54) ELASTIC MEMBER MADE OF EXPANDED RESIN BEADS, LAMINATED ELASTIC STRUCTURAL BODY, AND SEAT STRUCTURE

(75) Inventors: Etsunori Fujita, Hiroshima (JP); Yumi Ogura, Hiroshima (JP); Soichi Makita, Hiroshima (JP); Shigeki Wagata, Hiroshima (JP); Seiji Kawasaki, Hiroshima (JP); Yuji Hattori, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 781 days.

(21) Appl. No.: 12/993,968

(22) PCT Filed: May 22, 2009

(86) PCT No.: PCT/JP2009/059447
§ 371 (c)(1),
(2), (4) Date: Feb. 14, 2011

(87) PCT Pub. No.: WO2009/142301
PCT Pub. Date: Nov. 26, 2009

(65) Prior Publication Data
US 2011/0148175 A1    Jun. 23, 2011

(30) Foreign Application Priority Data

May 22, 2008  (JP) ................................. 2008-134192

(51) Int. Cl.
*A47C 7/02*  (2006.01)
*B60N 2/70*  (2006.01)

(52) U.S. Cl.
CPC ........................................ *B60N 2/70* (2013.01)
USPC ................................ 297/452.61; 297/452.55

(58) Field of Classification Search
USPC ............. 297/452.55, 452.48, 452.49, 452.58, 297/452.61
See application file for complete search history.

(56) References Cited

U.S. PATENT DOCUMENTS 2,596,292 A * 5/1952 Sackner ........................ 428/171
3,109,679 A * 11/1963 Eames .................... 297/452.61
(Continued)

FOREIGN PATENT DOCUMENTS

JP           59 22      1/1984
JP        61 177235     8/1986
(Continued)

OTHER PUBLICATIONS

International Search Report issued Jul. 7, 2009 in PCT/JP09/059447 filed May 22, 2009.
(Continued)

*Primary Examiner* — David R Dunn
*Assistant Examiner* — Alexander Harrison
(74) *Attorney, Agent, or Firm* — Oblon, Spivak, McClelland, Maier & Neustadt, L.L.P.

(57) ABSTRACT

To achieve weight reduction while providing elasticity sufficient in a cushioning member for a vehicle seat, an elastic member made of expanded resin beads includes an elastic covering material having stretching properties stuck to an outer face of an expanded bead body. Therefore, when the elastic member made of expanded resin beads is bent or compressed, the respective beads themselves configuring the expanded bead body are elastically deformed according to stretching or compressing of the elastic covering material, and since the elastic deformation is not such deformation that a gap between beads of the expanded bead body largely expands, a crack occurring between beads or permanent deformation does not occur so that bending or compressing becomes possible. Accordingly, the elastic member made of expanded resin beads is suitable as a cushioning member utilizing an elastic recovering force in a bending direction and a thickness direction thereof.

14 Claims, 17 Drawing Sheets

(56) References Cited

U.S. PATENT DOCUMENTS

| | | | |
|---|---|---|---|
| 3,222,696 A * | 12/1965 | Grimshaw | 5/402 |
| 3,298,046 A * | 1/1967 | Clementi et al. | 5/655.9 |
| 3,441,315 A * | 4/1969 | Paes et al. | 297/452.21 |
| 3,675,970 A * | 7/1972 | Bereday | 297/452.55 |
| 4,579,388 A * | 4/1986 | Urai | 297/452.61 |
| 4,623,571 A * | 11/1986 | Yamamoto et al. | 428/68 |
| 5,429,852 A * | 7/1995 | Quinn | 428/71 |
| 5,522,645 A * | 6/1996 | Dahlbacka | 297/452.55 |
| 5,704,691 A * | 1/1998 | Olson | 297/452.55 |
| 5,788,332 A * | 8/1998 | Hettinga | 297/452.55 |
| 5,857,749 A * | 1/1999 | DeBellis et al. | 297/452.41 |
| 6,168,239 B1 * | 1/2001 | Conner et al. | 297/452.31 |
| 6,199,252 B1 * | 3/2001 | Masters et al. | 29/91.1 |
| 6,286,903 B1 * | 9/2001 | Proux | 297/452.26 |
| 7,503,627 B2 * | 3/2009 | Kawasaki | 297/452.56 |
| 7,533,941 B2 * | 5/2009 | Saitou et al. | 297/452.55 |
| 2003/0116999 A1 * | 6/2003 | Fujita et al. | 297/216.13 |
| 2007/0200417 A1 * | 8/2007 | York et al. | 297/452.55 |
| 2011/0210597 A1 * | 9/2011 | Takeuchi et al. | 297/452.55 |
| 2011/0278902 A1 * | 11/2011 | Galbreath et al. | 297/452.48 |
| 2012/0326484 A1 * | 12/2012 | Kawano et al. | 297/452.55 |
| 2014/0054948 A1 * | 2/2014 | Bachar | 297/452.48 |

FOREIGN PATENT DOCUMENTS

| | | |
|---|---|---|
| JP | 3 001 375 | 6/1994 |
| JP | 3001375 | 6/1994 |
| JP | 7 303769 | 11/1995 |
| JP | 2002 361671 | 12/2002 |
| JP | 2003 61790 | 3/2003 |
| JP | 2003 129330 | 5/2003 |
| JP | 2003 182427 | 7/2003 |
| JP | 2003 325273 | 11/2003 |
| JP | 2006 314500 | 11/2006 |

OTHER PUBLICATIONS

International Search Report issued Jan. 11, 2011 in PCT/JP2009/059447, filed May 22, 2009.

* cited by examiner (a)

(b)

(a)

(b)

ELASTIC MEMBER MADE OF EXPANDED RESIN BEADS, LAMINATED ELASTIC STRUCTURAL BODY, AND SEAT STRUCTURE

TECHNICAL FIELD

The present invention relates to an elastic member made of expanded resin beads using an expanded bead body, a laminated elastic structural body provided with the elastic member made of expanded resin beads, and a seat structure.

BACKGROUND ART

Patent Document 1 discloses a seat for a vehicle where an expanded bead body of polypropylene, polyethylene or the like is used as a cushioning member. Further, Patent Document 2 discloses a seat for a vehicle where a three-dimensional solid knitted fabric is used as a cushioning member.

CITATION LIST

Patent Literature

Patent Document 1: Japanese Patent Application Laid-open No. 2003-325273
Patent Document 2: Japanese Patent Application Laid-open No. 2003-182427

SUMMARY OF INVENTION

Technical Problem

The three-dimensional solid knitted fabric disclosed in Patent Document 2 is lighter and higher in cushioning property than urethane foam conventionally used as a cushioning member for a seat for a vehicle. In recent years, particularly, in view of improvement of fuel efficiency or the like, weight reduction of a vehicle is expected, so that a seat for a vehicle using a three-dimensional solid knitted fabric as a cushioning member is becoming popular. A cushioning member using an expanded bead body is also effective for weight reduction. Patent Document 1 describes deflecting a cushioning member comprising an expanded bead body to utilize a spring property thereof. However, if the expanded bead body is deflected or bent, a crack easily occurs between beads on a stretching side of the expanded bead body in a bending direction, which may result in breaking of the expanded bead body. Therefore, it is difficult to deflect the expanded bead body without breaking the same to utilize the spring property thereof. Further, in the expanded bead body, compression set strain easily occurs on a shrinking side of the expanded bead body in a bending direction and when the expanded bead body is placed on a flat face and it is pressed in a thickness direction thereof, compression set occurs easily. Therefore, even if elasticity of the expanded bead body in the thickness direction is tried to be utilized without deflecting the expanded bead body, a pressing force is restricted, so that, even though the expanded bead body is utilized as a member for imparting some cushioning properties to an interior part of an automobile, it is hardly used as a cushioning member for a seat for a vehicle.

The present invention has been made in view of the above, and an object thereof is to provide an elastic member made of expanded resin beads which does not cause a crack or a permanent set against a repetitive bending load or a compression load, which is provided with a sufficient elasticity as a cushioning member for a seat for a vehicle, and which can achieve further weight reduction of a seat for a vehicle or the like, a laminated elastic structural body comprising a laminated structure using the elastic member made of expanded resin beads, and a seat structure using the elastic member made of expanded resin beads and the laminated elastic structure as cushioning members.

Solution to Problem

In order to solve the above problem, the present invention provides an elastic member made of expanded resin beads comprising: an expanded bead body; and an elastic covering material stuck to an outer face of the expanded bead body and having predetermined stretching properties. The expanded bead body may be configured such that at least either one of a portion worked to be reduced in thickness and a through-hole portion extending in a thickness direction is partially formed in the expanded bead body. It is preferred that the elastic covering material is configured to be stuck on an outer face of the expanded bead body. Such a configuration can be adopted that at least two layers of the expanded bead bodies are laminated on each other and the elastic covering material is stuck on an outermost layer of the at least two layers laminated. Such a configuration can be adopted that another elastic member is disposed into at least one interlayer of the expanded bead bodies. In this case, it is preferred that the another elastic member is a three-dimensional solid knitted fabric having a pair of ground knitted fabrics disposed separately from each other and a lot of connecting strands which are reciprocated between the pair of ground knitted fabrics to connect both the ground knitted fabrics. It is preferred that the elastic covering material has an extension percentage of at least 200% and a recovery rate of at least 80% at 100% extension time. It is preferred that the elastic covering material is made of elastic fiber unwoven fabric where thermoplastic elastomer elastic fibers are mutually bonded in a melting manner. It is preferred that the expanded bead body is an expanded formation body made with a bead method of a resin containing at least one of polystyrene, polypropylene, and polyethylene.

Further, the present invention provides a laminated elastic structural body configured by laminating the elastic member made of expanded resin beads on another elastic member. In this case, it is preferred that the another elastic member is a three-dimensional solid knitted fabric having a pair of ground knitted fabrics disposed separately from each other and a lot of connecting strands which are reciprocated between the pair of ground knitted fabrics to connect the both.

Furthermore, the present invention provides a laminated elastic structure where a plurality of layers of the elastic members made of expanded resin beads are provided via the another elastic member, and portions worked to be reduced in thickness or through-hole portions extending in a thickness direction of the layers, the portions or the through-hole portions being formed in the expanded bead bodies of the elastic members made of expanded resin beads in the respective layers, are formed at positions approximately coincident with each other or different from each other. It is preferred that the laminated elastic structural body is further laminated with a flame-resistant cloth.

Further, the present invention provides a seat structure provided with a cushion pan and a cushioning member set on the cushion pan, wherein the elastic member made of expanded resin beads is used as the cushioning member, and the cushion pan is provided with pan frames configuring two layers having a space formed therebetween.

The present invention provides a seat structure provided with a cushion pan and a cushioning member set on the cushion pan, wherein the laminated elastic structural body is used as the cushioning member, and the cushion pan is provided with pan frames configuring two layers having a space formed therebetween.

Advantageous Effects of Invention

The elastic member made of expanded resin beads of the present invention has a structure where an elastic covering material having stretching properties is stuck on an outer face of an expanded bead body. Therefore, when the elastic member made of expanded resin beads of the present invention is bent or compressed, the respective beads configuring the expanded bead body themselves is elastically deformed according to stretching and compressing of the elastic covering material, and since the elastic deformation is not such deformation that a space between beads of the expanded bead body spreads largely, the elastic member made of expanded resin beads can be bent or compressed without generating a crack between the beads or a permanent set. Accordingly, the elastic member made of expanded resin beads is suitable as a light-weight cushioning member utilizing elastic restoring force in a bending direction and a thickness direction thereof.

Further, when the elastic member made of expanded resin beads and another elastic member such as a three-dimensional solid knitted fabric are laminated with each other, stroke feeling or load dispersibility can be increased by using the both together while maintaining a light-weight property.

Further, softer elasticity can be achieved by using an expanded bead body where at least either one of a portion worked to be reduced in thickness or a through-hole portion extending in a thickness direction of the expanded bead body is partially formed.

DESCRIPTION OF EMBODIMENTS

Figure 1:
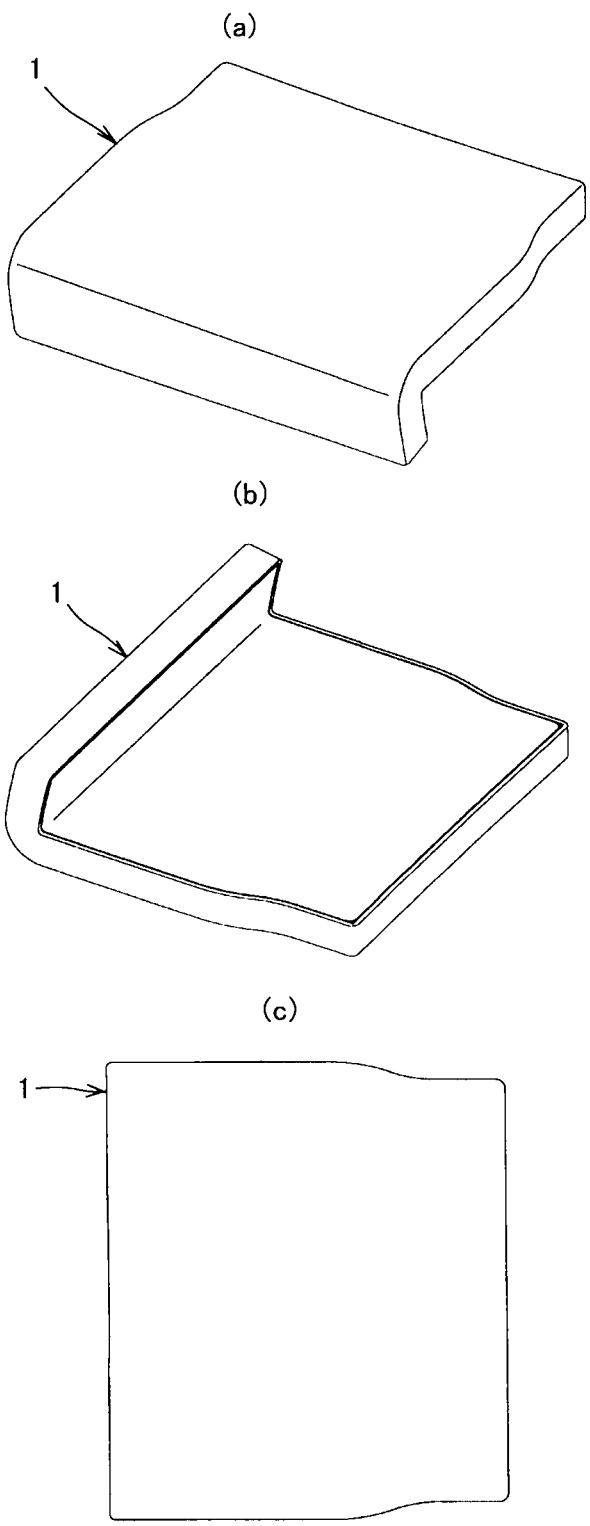
FIGS. 1A to 1C show an appearance of a laminated elastic structural body according to an embodiment of the present invention, FIG. 1A being a perspective view of the laminated elastic structural body viewed from an upper face thereof, FIG. 1B being a perspective view of the laminated elastic structural body viewed from a bottom face thereof, and FIG. 1C being a plan view of the laminated elastic structural body.
Figure 2:
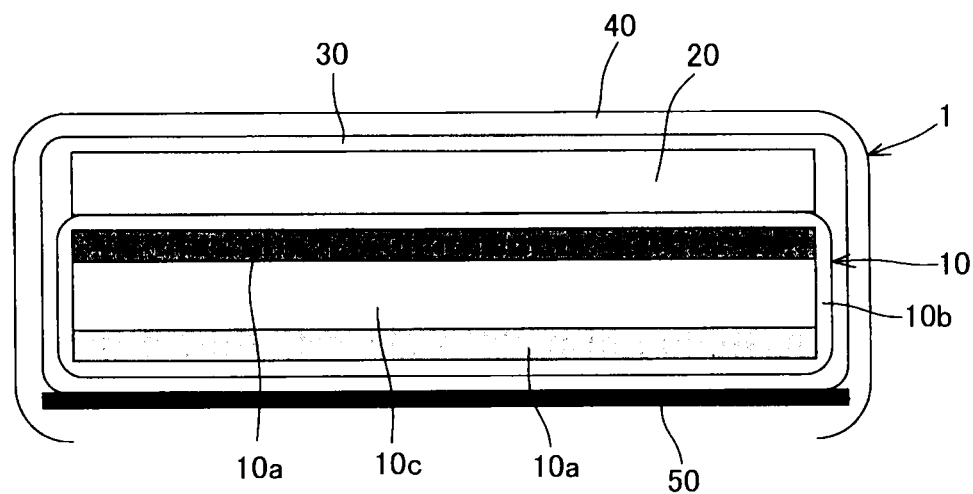
FIG. 2 is a diagram illustratively showing a section of the laminated elastic structural body of the embodiment.
Figure 3:
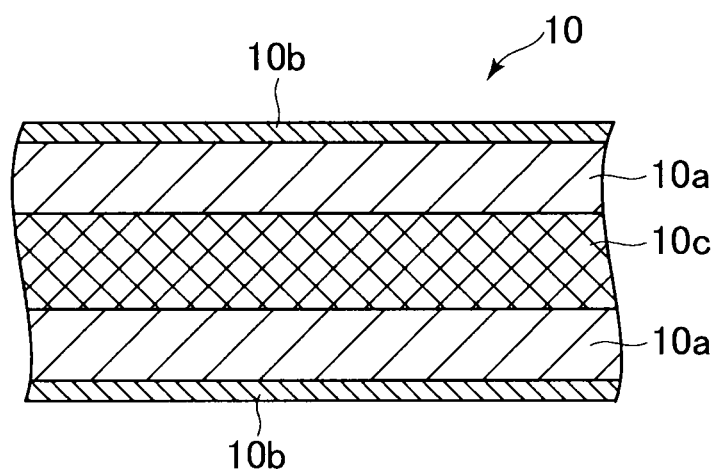
FIG. 3 is a diagram showing a configuration of an elastic member made of expanded resin beads used in the embodiment.

Hereinafter, embodiments of the present invention will be explained in detail with reference to the drawings. FIGS. 1 to 3 are diagrams showing a laminated elastic structural body 1 according to a first embodiment of the present invention. An example of using the laminated elastic structural body 1 according to this embodiment as a cushioning member configuring a seat cushion section of a seat for an automobile is shown, but this is merely an example and it is obviously possible to use the laminated elastic structural body 1 as a cushioning member configuring a seatback section or another cushion section.

As shown in FIG. 2, the laminated elastic structural body 1 comprises a laminated body of an elastic member 10 made of expanded resin beads, a three-dimensional solid knitted fabric 20, and the like. Specifically, the three-dimensional solid knitted fabric 20 is laminated on the elastic member 10 made of expanded resin beads, an outer circumference of the laminated members is laminated is covered with a flame-resistant cloth 30, the covered laminated members are set on a cushion pan 50 (an upper side pan frame 51), and an outer skin 40 such as a pure skin or a synthetic leather is laminated thereon.

The elastic member 10 made of expanded resin beads is formed in an approximately flat plate shape with approximately the same width and length as the cushion pan 50, and it comprises two expanded bead bodies 10a, a three-dimensional solid knitted fabric 10c which is another elastic member disposed therebetween, and an elastic covering material 10b which is stuck to an outermost layer. The three-dimensional solid knitted fabric 10c and each of the expanded bead bodies 10a are stuck to each other by using adhesive. As the expanded bead body 10a, an expanded formation body obtained by applying a bead method to resin containing at least one of polystyrene, polypropylene, and polyethylene is used. Incidentally, expansion ratio is arbitrary and it is not limited to a specific one.

The elastic covering material 10b is stuck to an outer face of the elastic member 10 made of expanded resin beads via adhesion, and it must be made from a material having a high extension percentage and a high recovery rate in order to prevent a crack occurring when the elastic member 10 made of expanded resin beads is bent, so that a material whose extension percentage is at least 200% and whose recovery rate at 100% extension percentage time is at least 80% is preferably used. As such an elastic covering material 10b, for example, the unwoven fabric where thermoplastic elastomer elastic fibers have been stuck to each other in a melting manner is used, which is disclosed in JP-A-2007-92217, can be used. Specifically, trade name "Espansione" produced by KB SEIREN, LTD. can be used.

the three-dimensional solid knitted fabric 10c is a knitted fabric having a solid three-dimensional structure having a pair of ground knitted fabrics disposed separately from each other and a lot of connecting strands reciprocated between the pair of ground knitted fabrics to connect both the ground knitted fabrics, for example, as disclosed in JP-A-2002-331603. One of the ground knitted fabrics is formed, for example, in a flat knitted texture (fine mesh) continuing both in a wale direction and a course direction from strings obtained by twisting a monofilament, and the other ground knitted fabric is formed, for example, in a knitted stitch structure having a honeycomb-shaped (hexagonal) mesh from strings obtained by twisting short fibers. Of course, the knitted fabric texture is arbitrary, any knitted fabric texture other than the fine mesh texture or the honeycomb shape can be adopted, the fine mesh texture can be adopted for both the ground knitted fabrics, and a combination of the knitted fabric textures can be set arbitrarily. The connecting strands are knitted between the two ground knitted fabrics such that one of the ground knitted fabrics and the other thereof are kept away from each other by a predetermined distance. As the three-dimensional solid knitted fabric 10c, Production Number 49011D, 49013D or the like produced by Suminoe Textile Co., Ltd. can be used.

In the embodiment, as shown in FIG. 3, as the elastic member 10 made of expanded resin beads having a configuration covered with the elastic covering material 10b, one provided with the expanded bead bodies 10a, 10a, and the three-dimensional solid knitted fabric 10c inside the elastic covering material 10b is used, but the three-dimensional solid knitted fabric 20 serving as another elastic member is further laminated on the elastic member 10 made of expanded resin beads, as shown in FIG. 2. Thereby, functions of preventing bottom contact, stroke feeling, and vibration absorbing are further improved. As the three-dimensional solid knitted fabric 10c included in the elastic member 10 made of expanded resin beads and the three-dimensional solid knitted fabric 20 disposed outside the elastic member 10 made of expanded resin beads, ones having the same property can be used, but ones having different properties may be used. Instead of the three-dimensional solid knitted fabric 10c in the elastic member 10 made of expanded resin beads, it is possible to use a thin polyurethane foam having a thickness of, for example, 10 mm or less, and it is possible to laminate a polyurethane foam in addition to the three-dimensional solid knitted fabric 10c. Similarly, instead of the three-dimensional solid knitted fabric 20 serving as another elastic member, it is also possible to use a thin polyurethane foam having a thickness of, for example, 10 mm or less, and it is also possible to laminate a polyurethane foam in addition to the three-dimensional solid knitted fabric 10c. However, it is preferred that a three-dimensional solid knitted fabric is used, as described above. Besides the abovementioned method using adhesive, Frame laminating work or vibration-melting adhesion can be used for adhesion between the elastic covering material 10b and the expanded bead body 10a, and adhesion between the expanded bead body 10a and the three-dimensional solid knitted fabric 10c or the like. In this case, the vibration-melting adhesion or the like can be performed with intervention of any binder as necessary. Since adhesive is not used in each of these methods, weight reduction can be achieved and nonuse of adhesive also contributes to reduction of production cost.

It is preferred that the flame-resistant cloth 30 is used especially when the cushioning member 1 of this embodiment is adopted as a cushioning member for a seat for such a vehicle as an airplane, a train, or an automobile. For example, "LASTAN" (Registered Trademark) produced by Asahi Kasei Trading Service Co., Ltd. can be used. Further, a member obtained by laminating an aluminum foil on the "LASTAN" (Registered Trademark) may be used.

Figure 4:
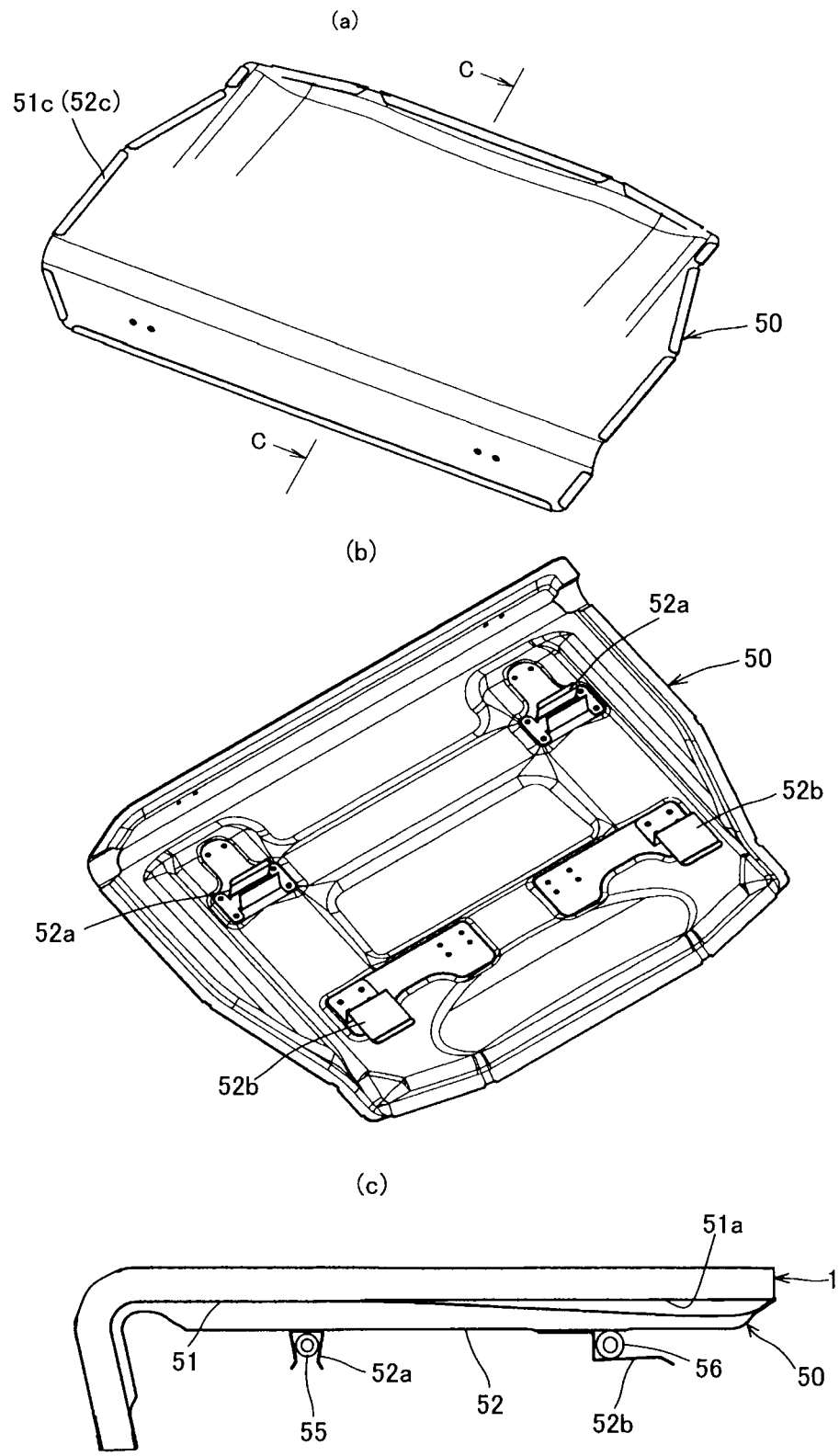
FIGS. 4A to 4C are diagrams showing a cushion pan on which a laminated elastic structural body is supported, FIG. 4a being a perspective view of the cushion pan viewed from an upper face thereof, FIG. 4B being a perspective view of the cushion pan viewed from a bottom face thereof, and FIG. 4C being a sectional view of the cushion pan taken along line C-C in FIG. 4A.

As described above, the laminated elastic structural body 1 is set on the cushion pan 50. As shown in FIGS. 4A to 4C, the cushion pan 50 is provided with pan frames 51 and 52 configuring two upper and lower layers, and the laminated elastic structural body 1 is disposed on the pan frame 51 configuring the upper layer. At this time, while the laminated elastic structural body 1 is provided such that its portions positioned near both side portions in a widthwise direction thereof contact with an upper face of the pan frame 51 configuring the upper layer, a portion of the pan frame 51 configuring the upper layer, which is positioned at an approximately central portion in the widthwise direction is slightly bent downwardly, so that a space 51a is formed between a lower face of the laminated elastic structural body 1 and an upper face of the pan frame 51 configuring the upper layer. Thereby, since the laminated elastic structural body 1 can be deflected by an amount corresponding to the space 51a and a bending elasticity occurs, the spring constant of the laminated elastic structural body 1 becomes small.

As shown in FIG. 4A, respective peripheral edge portions 51c and 52c of the pan frame 51 configuring the upper layer and the pan frame 52 configuring the lower layer are subjected to hemming work so that a space 53 is formed between the pan frames 51 and 52. It is preferred that adhesive of such elastic series as silicon series is interposed between the peripheral edge portions 51c and 52c to be subjected to the hemming work. By providing the space 53, spring feeling can be generated by deflection of the pan frame 51 configuring the upper layer so that a cushioning property is improved. Further, since supporting is performed by the adhesive of elastic series, when the pan frame 51 configuring the upper layer is deflected, viscous damping occurs between the peripheral edge portions 51c and 52c between which the adhesive is interposed, so that a vibration absorbing property is improved.

Figure 5:
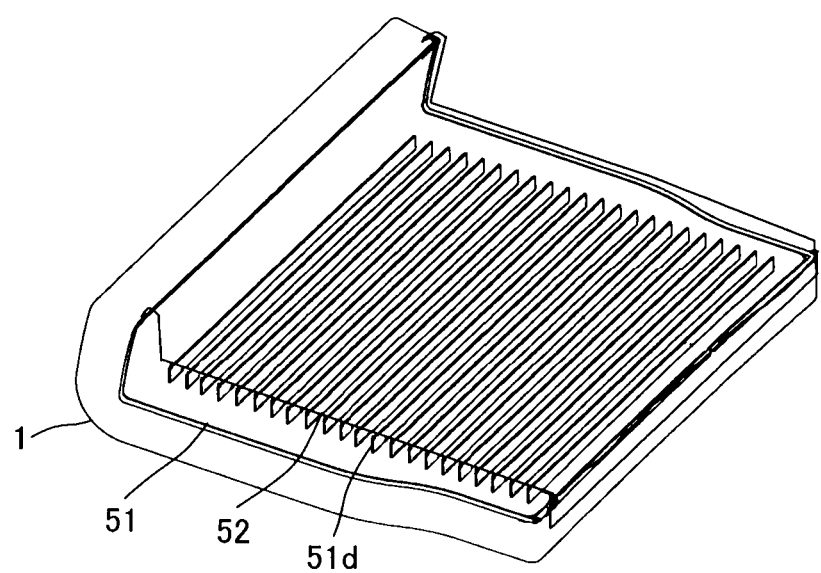
FIGS. 5A and 5B are diagrams for explaining an aspect of a cushion pan where radiating fins are provided on a back face of the pan frame which configures an upper layer of the cushion pan.
Figure 5:
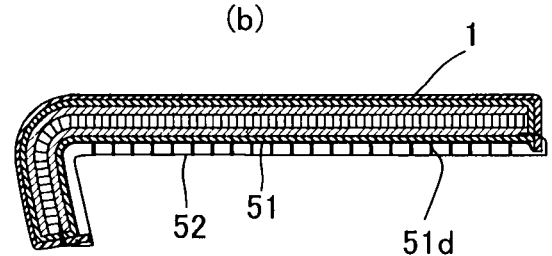

Heat resistance and radiation performance are also improved by the space 53 between the pan frame 51 configuring the upper layer and the pan frame 52 configuring the lower layer. Further, the cushion pan 50 shown in FIGS. 4A to 4c is structured such that its mounting is performed by engaging engagement leaf spring portions 52a and 52b attached to front portions and rear portions of the pan frame 52 configuring the lower layer with supporting flames 55 and 56 supported on leg portions fixed on a floor in an airplane, and heat of the pan frame 52 configuring the lower layer is diffused via the engagement spring portions 52a and 52b and the supporting flames 55 and 56. Incidentally, as shown in FIGS. 5A and 5B, such a configuration can be adopted that the cushion pan 50 is configured to have pan frames 51 and 52 configuring two layers so that the space 53 is formed between both the pan frames, and radiation fins 51d are provided on a back face of the pan frame 51 configuring the upper layer in a projecting manner, so that radiation performance is further improved.

Figure 6:
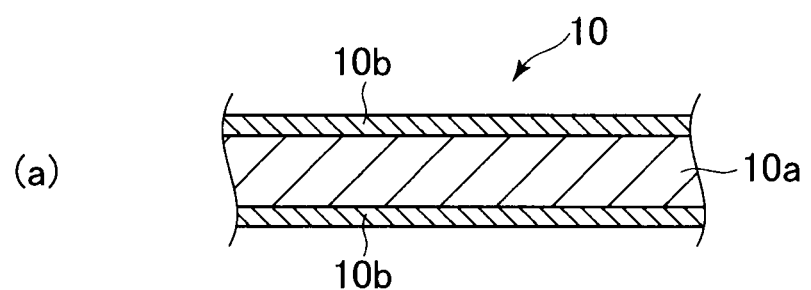
FIG. 6A is a diagram showing another aspect of the elastic member made of expanded resin beads.
FIG. 6B is a diagram showing another aspect of the laminated elastic structural body.
Figure 6:
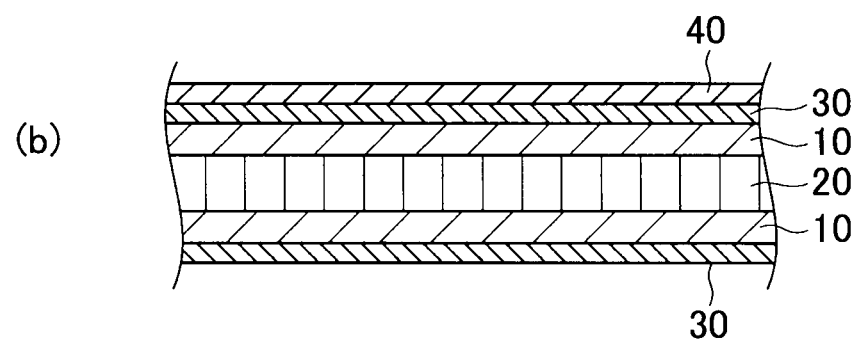

As shown in FIG. 2 and FIG. 3, as the elastic member 10 made of expanded resin beads having a configuration covered with the elastic covering material 10b, one provided with the expanded bead bodies 10a and 10a, and the three-dimensional solid knitted fabric 10c inside the elastic covering material 10b is used in the embodiment, but this configuration is merely one example, and the elastic member 10 made of expanded resin beads may have such a configuration that the elastic covering materials 10b are stuck on both outer faces of the expanded bead body 10a, as shown in FIG. 6A. As shown in FIG. 6B, such a configuration can be adopted that two elastic members 10 and 10 made of expanded resin beads are used, a three-dimensional solid knitted fabric 20 is disposed between the two elastic members 10 and 10 made of expanded resin beads, and a heat-resistant cloth 30 or a surface skin 40 is disposed outside the elastic members 10 and 10 made of expanded resin beads. Incidentally, the respective numbers of elastic members 10 made of expanded resin beads and three-dimensional solid knitted fabrics to be used are not limited to specific ones, and at least one of the number of elastic members 10 made of expanded resin beads and number of the three-dimensional solid knitted fabric can be set to one and such a configuration can be adopted that at least one of the numbers is set to three or more, of course.

Figure 7:
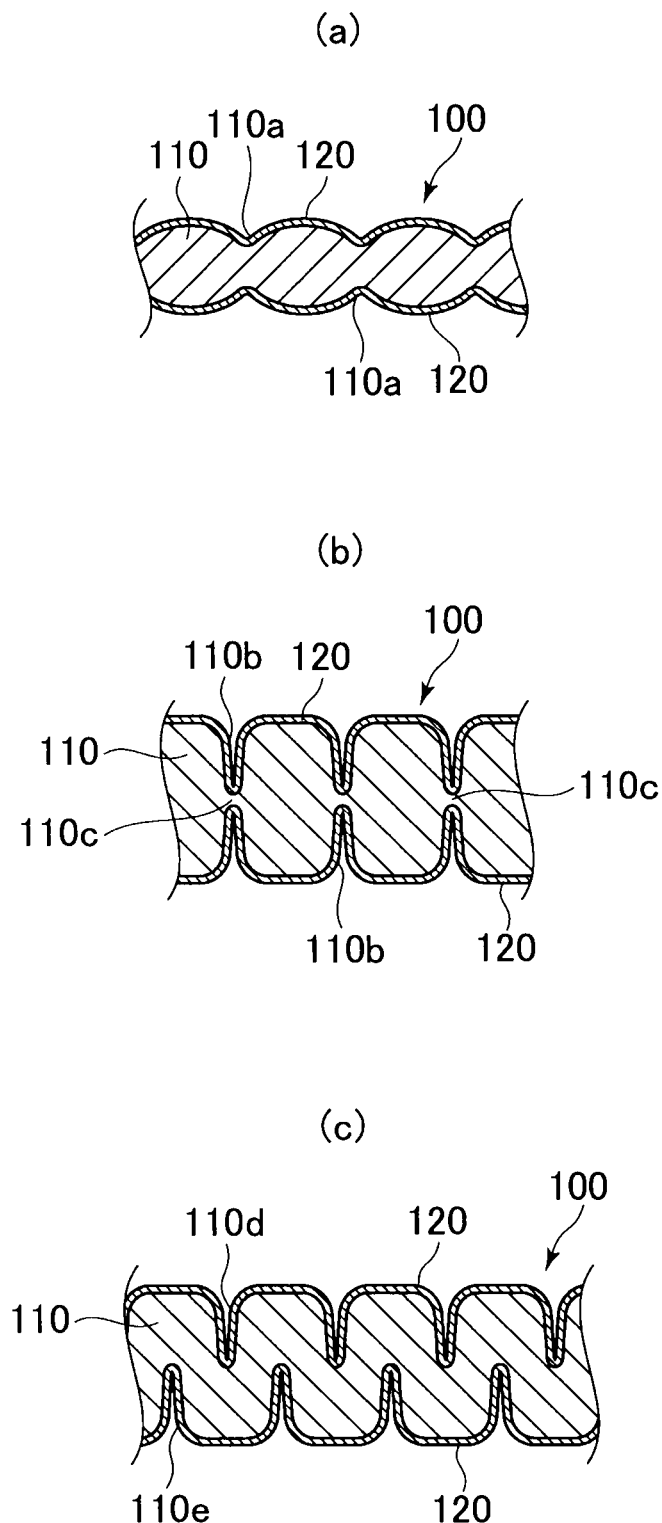
FIGS. 7A to 7C are diagrams showing an elastic member made of expanded resin beads according to a second embodiment of the present invention.

FIGS. 7A to 7C are diagrams showing an elastic member 100 made of expanded resin beads according to a second embodiment of the present invention. As shown in these figures, in the embodiment, such a configuration is adopted that an expanded bead body 110 configuring the elastic member 100 made of expanded resin beads is partially formed with at least either one of a portion worked to be reduced in thickness of the expanded bead body 110 and a through-hole portion extending in a thickness direction of the expanded bead body 110 and an elastic covering material 120 is stuck on a surface of the expanded bead body 110.

FIG. 7A of these figures shows a type where shallow recessed portions 110a viewed in section are formed on the expanded bead body 110, and FIG. 7B is a type where deeper recessed portions (cut-shaped or slit-shaped ones) 110b are formed thereon and connecting portions 110c are left near a central portion of the expanded bead body 110 in its widthwise direction. FIG. 7C is a type where recessed portions 110d formed on one face side of the expanded bead body 110 and recessed portions 110e formed on the other face side of the expanded bead body 110 are disposed in a staggered manner. Incidentally, it is preferred that the elastic covering materials 120 are provided so as to closely contact with the respective surfaces of these recessed portions 110a, 110b, 110d, and 110e, and the connecting portions 110c. When the recessed portions have such a shape as a cut like the recessed portion 110b, 110d or 110e shown in FIG. 7B or 7C, the elastic covering material 120 may be stuck to the expanded bead body 110 without entering such a cut-shaped recessed portion.

Figure 8:
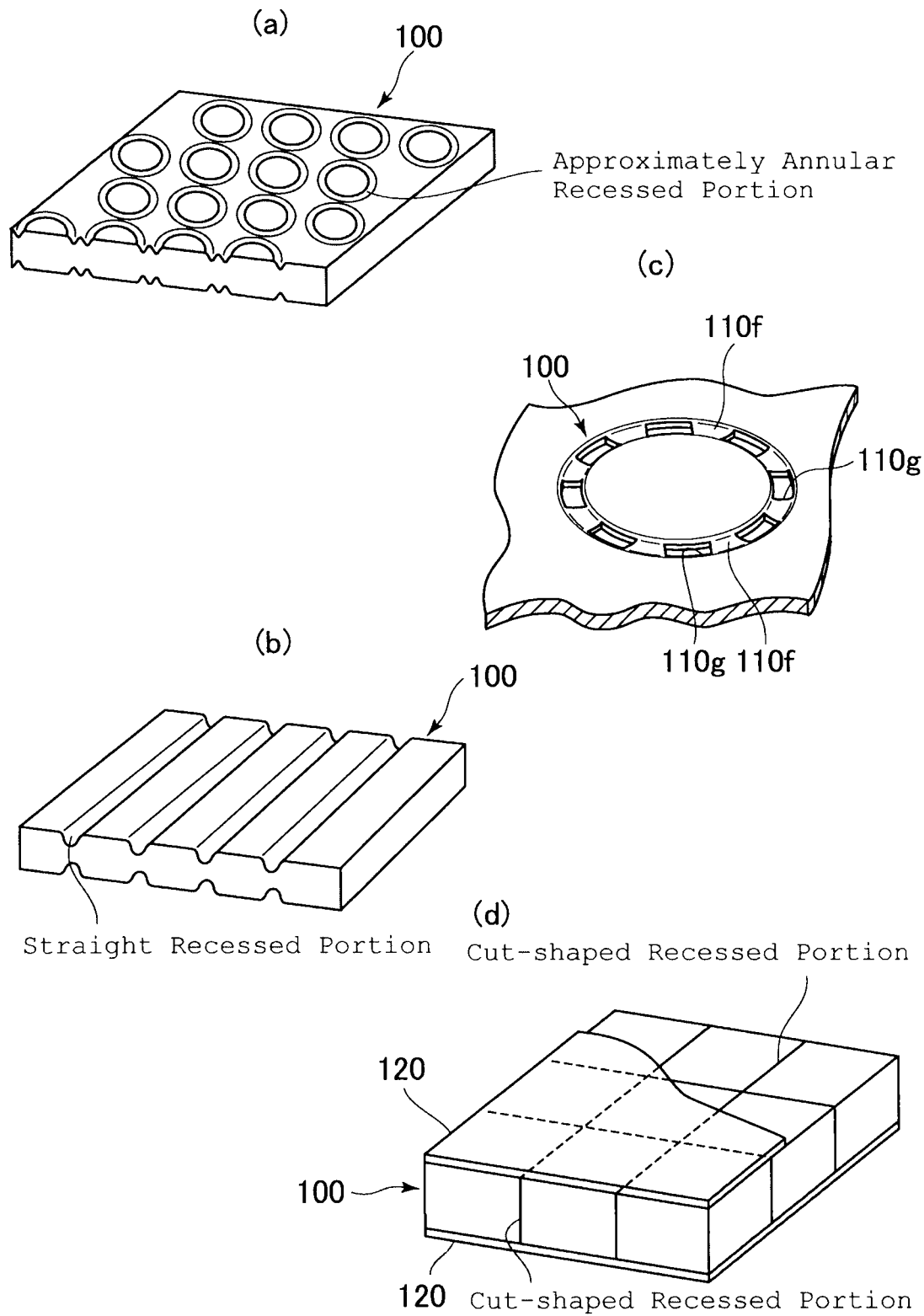
FIG. 8A to 8D are diagrams showing variations of a recessed portion formed in an elastic member made of expanded resin beads.

As the shape of each of the recessed portions 110a, 110b, 110d, and 110e viewed from their upper faces, the recessed portion may be formed in an approximately circular shape, for example, as shown in FIG. 8A, or it may be formed in a straight shape, as shown in FIG. 8B. As shown in FIG. 8C, such a configuration can be adopted that a recessed portion 110f thinner than the other portion of the expanded bead body 110 is formed in an approximately circular shape, and through-hole portions 110g partially extending through the expanded bead body 110 are formed along the circumference of the circular recessed portion 110f. Further, the recessed portions may be formed in a matrix shape, as shown in FIG. 8D. Incidentally, FIG. 8D shows an example where the elastic covering materials 120 are stuck on the expanded bead body 110 in a planar manner without entering the cut-shaped recessed portions.

The respective numbers of recessed portions and through-hole portions to be formed, the respective shapes thereof, and the like are merely examples and they are not limited to ones shown in the embodiments. By forming such a recessed portion or a through-hole portion in the expanded bead body 110, the spring characteristic of the elastic member 100 made of expanded resin beads becomes softer. By adjusting the number of recessed portions or through-hole portions to be formed, the respective shapes thereof, or the like variously, elastic members 10 made of expanded resin beads having various spring characteristics can be produced. Incidentally, the expanded bead body has such a characteristic that it further exerts a property of an elastic body according to further compression so that it becomes softer regarding cushion characteristic.

Figure 9:
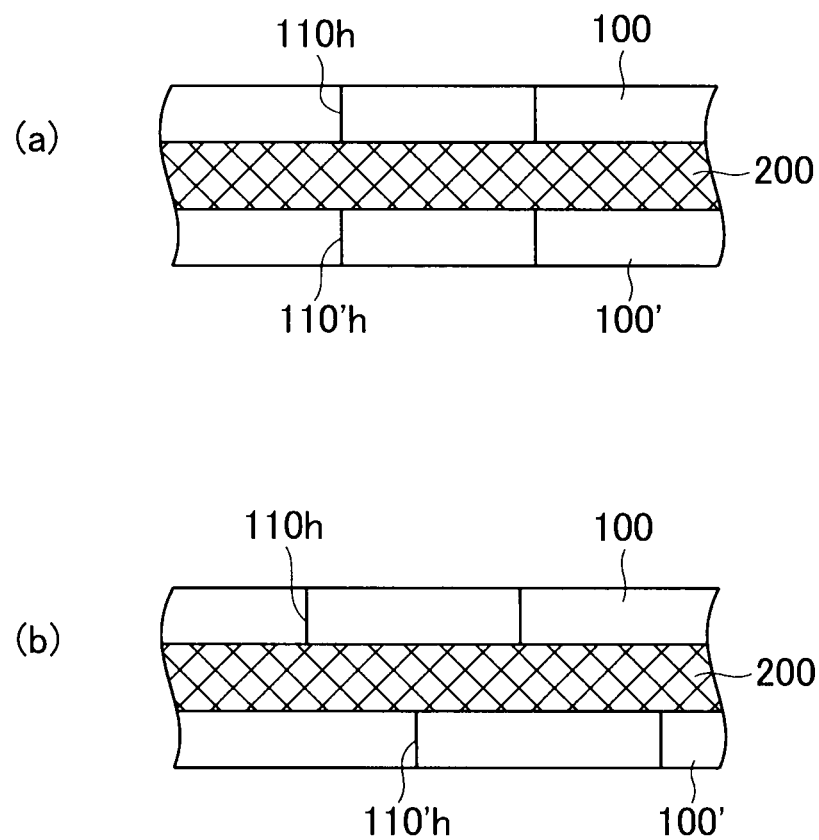
FIGS. 9A and 9B are diagrams showing variations of formation positions of cut-shaped recessed portions.

As shown in FIGS. 9A and 9B, a spring characteristic can be adjusted by setting formation positions of recessed portions 110h and 110'h respectively formed in two elastic members 100 and 100' made of expanded resin beads sandwiching a three-dimensional solid knitted fabric 200 at positions approximately coincident with each other (FIG. 9A) or setting them at positions different from each other (FIG. 9B).

TEST EXAMPLE 1

A load-deflection characteristic of the laminated elastic structural body 1 according to the first embodiment was examined. A configuration of the laminated elastic structural body 1 used in the test was the same as shown in FIG. 2. That is, an expanded bead body 10a having a thickness of about 7 mm and expansion ratio of 60 times, a three-dimensional solid knitted fabric 10c (Product Number 49011D produced by Suminoe Textile Co., Ltd.) having a thickness of about 13 mm, and an expanded bead body 10a having a thickness of about 7 mm and expansion ratio of 38 times were laminated in this order from a bottom side and the respective layers were stuck to each other by adhesive. A circumferential face of the members stuck to each other was stuck to an elastic covering material 10b (a trade name "Espansione" produced by KB SEIREN, LTD.) having a thickness of about 0.3 mm to be covered therewith, so that an elastic member 10 made of expanded resin beads was produced. Incidentally, the expanded bead body 10a was formed in a flat plate shape without any recessed portion or through-hole portion formed therein.

A three-dimensional solid knitted fabric 20 (Product Number 49013D produced by Suminoe Textile Co., Ltd.) having a thickness of about 13 mm was further stuck to the elastic member 10 made of expanded resin beads to be laminated thereon, and a laminated elastic structural body 1 was produced by covering the both with a flame-resistant cloth 30 ("LASTAN" (Registered Trademark) produced by Asahi Kasei Trading Service Co., Ltd.) with an aluminum foil having a thickness of about 3 mm so as to enclose them. The total thickness of the two expanded bead bodies 10a, the three-dimensional solid knitted fabric 10c (Product Number 49011D), and the three-dimensional solid knitted fabric 20 (Product Number 49013D) was about 40 mm and the weight thereof was 733 g.

Figure 10:
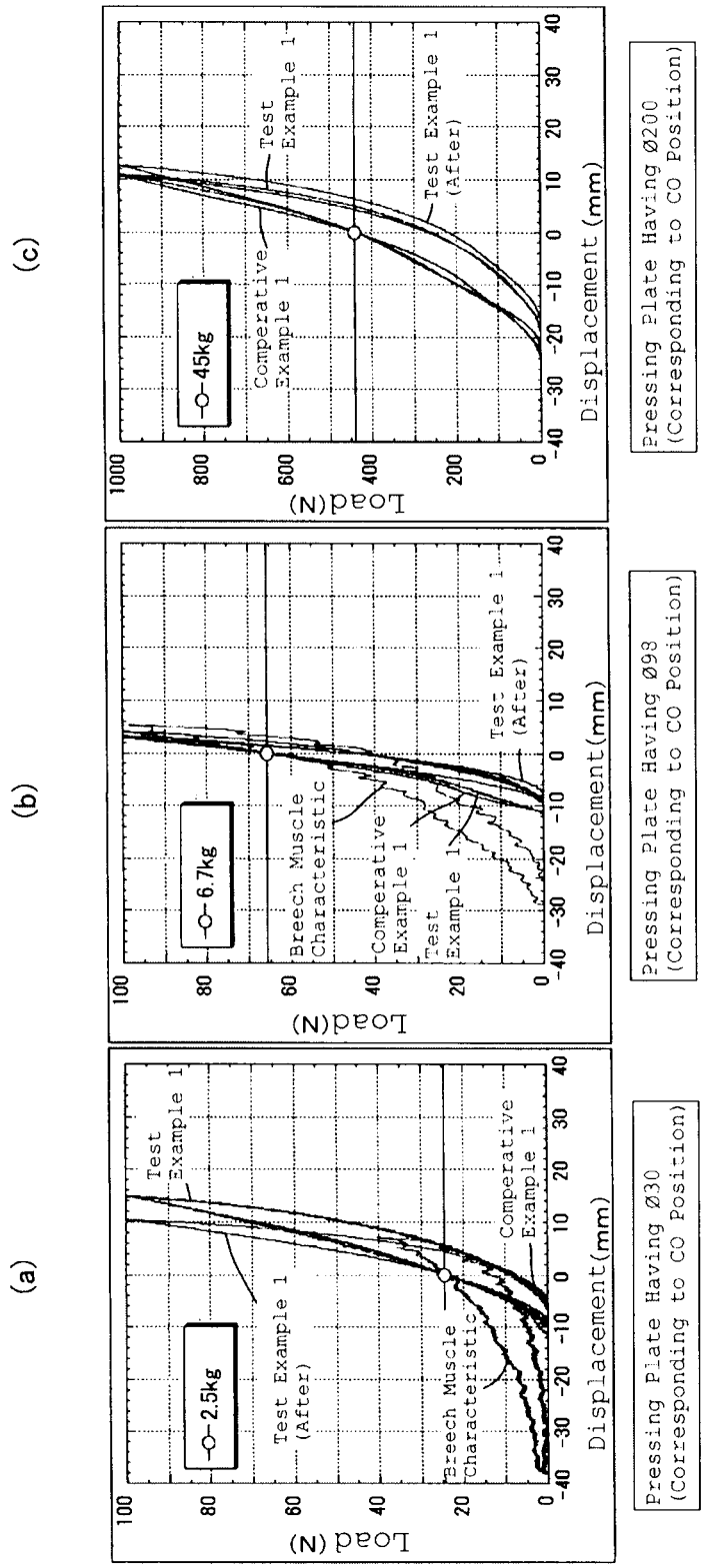
FIGS. 10A to 10C are graphs showing load-deflection characteristics of a laminated elastic structural body according to Test Example 1 and Comparative Example 1, FIG. 10A showing characteristics when the laminated elastic structural body and the Test Example 1 were pressed by a pressing plate having a diameter of 30 mm, FIG. 10B showing characteristics when the laminated elastic structural body and Test Example 1 were pressed by a pressing plate having a diameter of 98 mm, and FIG. 10C showing characteristics when the laminated elastic structural body and Test Example 1 were pressed by a pressing plate having a diameter of 200 mm.

FIGS. 10A to 10C are graphs showing a load-deflection characteristic of the abovementioned laminated elastic structural body 1, FIG. 10A showing data obtained when the laminated elastic structural body 1 was placed on a flat test stand and it was pressed up to 100 N by a pressing plate having a diameter of 30 mm, FIG. 7B showing data obtained when the laminated elastic structural body 1 was pressed up to 100 N by a pressing plate having a diameter of 98 mm, FIG. 7C showing data obtained when the laminated elastic structural body 1 was pressed up to 1,000 N by a pressing plate having a diameter of 200 mm. In each figure, Test Example 1 shows the load-deflection characteristic of the laminated elastic structural body 1 used in this test. Test Example 1 (after) shows a load-deflection characteristic of the laminated elastic structural body 1 measured after vibration duration test was performed. The vibration duration test was performed by vibrating the laminated elastic structural body 1 with a sine wave having a frequency of 5 Hz (a peak-to-peak distance of 5 mm) 250,000 times while applying a load of 48.2 kg to the laminated elastic structural body 1 by a pressing plate having a diameter of 200 mm.

Comparative Example 1 is a load-deflection characteristic of a cushioning member (a total thickness of about mm and a weight of 1,030 g) obtained by laminating a three-dimensional solid knitted fabric (Product Number T24004AH produced by Asahi Kasei Corporation) having a thickness of about 6 mm, a polyurethane foam having a thickness of about 8 mm, a three-dimensional solid knitted fabric (Product Number 49015D produced by Suminoe Textile Co., Ltd.) and having a thickness of about 15 mm, and a three-dimensional solid knitted fabric (Product Number 49013D produced by Suminoe Textile Co., Ltd.) in this order from a lowermost layer, and the cushioning member is a cushioning member having a characteristic approximating a load-deflection characteristic of a breech (haunch) muscle in a load-deflection characteristic obtained by using pressing plates having a diameter of 30 mm and a diameter of 98 mm.

From FIGS. 10A to 10C, the laminated elastic structural body 1 of Test Example 1 had approximately the same load-deflection characteristic as the cushioning member of Comparative Example 1 regarding the respective pressing plates having the diameter of 30 mm, the diameter of 98 mm, and the diameter of 200 mm, and the load-deflection characteristic approximated the characteristic of the breech (haunch) muscle. From this fact, it was found that the laminated elastic structural body 1 of Test Example 1 was thinner and lighter than the cushioning member of Comparative Example 1 and the former had a load-deflection characteristic equivalent to that of the latter.

The data of Test Example 1 (After) obtained after the vibration duration test was performed to the laminated elastic structural body 1 was slightly higher in spring constant than that obtained before the vibration duration test was performed to the laminated elastic structural body 1. However, it was found that there was not a large difference between the former and the latter regarding the characteristics obtained when pressings were performed using the pressing plates having the diameter of 98 mm and the diameter of 200 mm and the laminated elastic structural body 1 was excellent in durability even though the expanded bead bodies were used in the laminated elastic structural body 1.

TEST EXAMPLE 2

An elastic member made of expanded resin beads was produced by sticking an elastic covering material (Trade Name "Espansione" produced by KB SEIREN, LTD.) having a thickness of about 0.3 mm to both faces of an expanded bead body having a thickness of about 7 musing adhesive. However, test pieces of the elastic member made of expanded resin beads were prepared by using a polystyrene-polyolefin composite resin foam body (Trade Name "PIOCELAN O-SERIES", expansion ratio: 30 times) produced by SEKISUI PLASTICS CO., LTD. and a polyethylene foam made with a bead method (Trade Name "Eperan", expansion ratio: 38 times) produced by KANEKA CORPORATION as the expanded bead bodies and sticking a elastic covering material to the respective foams.

Two more test pieces of an elastic member made of expanded resin beads similar to the above were further prepared, these test pieces were pressed in a thickness direction thereof by using an annular pressing jig having a diameter of 30 mm so that recessed portions having a diameter of 30 mm were continuously formed on the test pieces (see FIG. 8A). Incidentally, the thickness of the recessed portion was set at about 2 mm.

Figure 11:
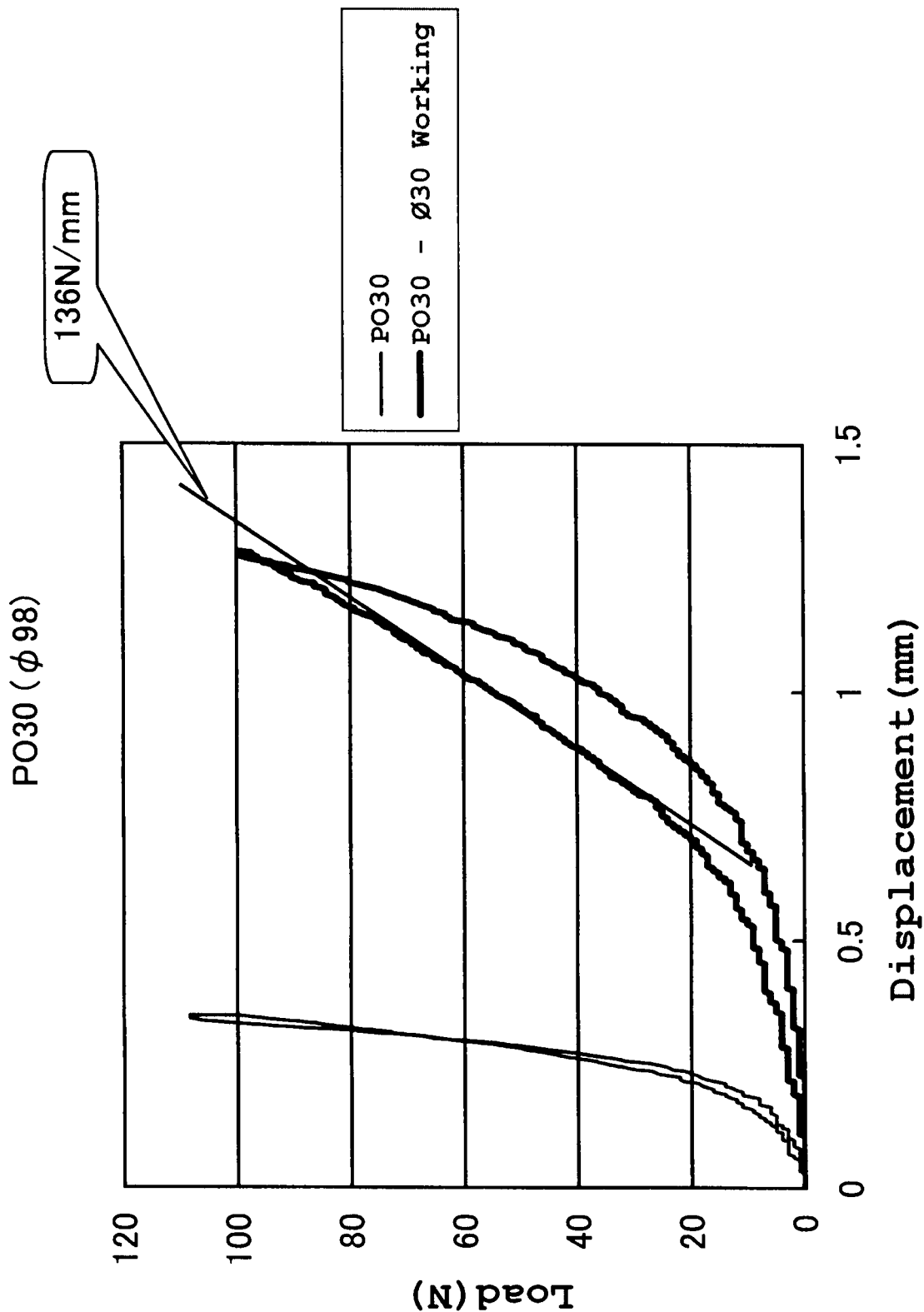
FIG. 11 is a graph showing load-deflection characteristics when a test piece using a polystyrene-polyolefin composite resin foam body was pressed by a pressing plate having a diameter of 98 mm in Test Example 2.
Figure 12:
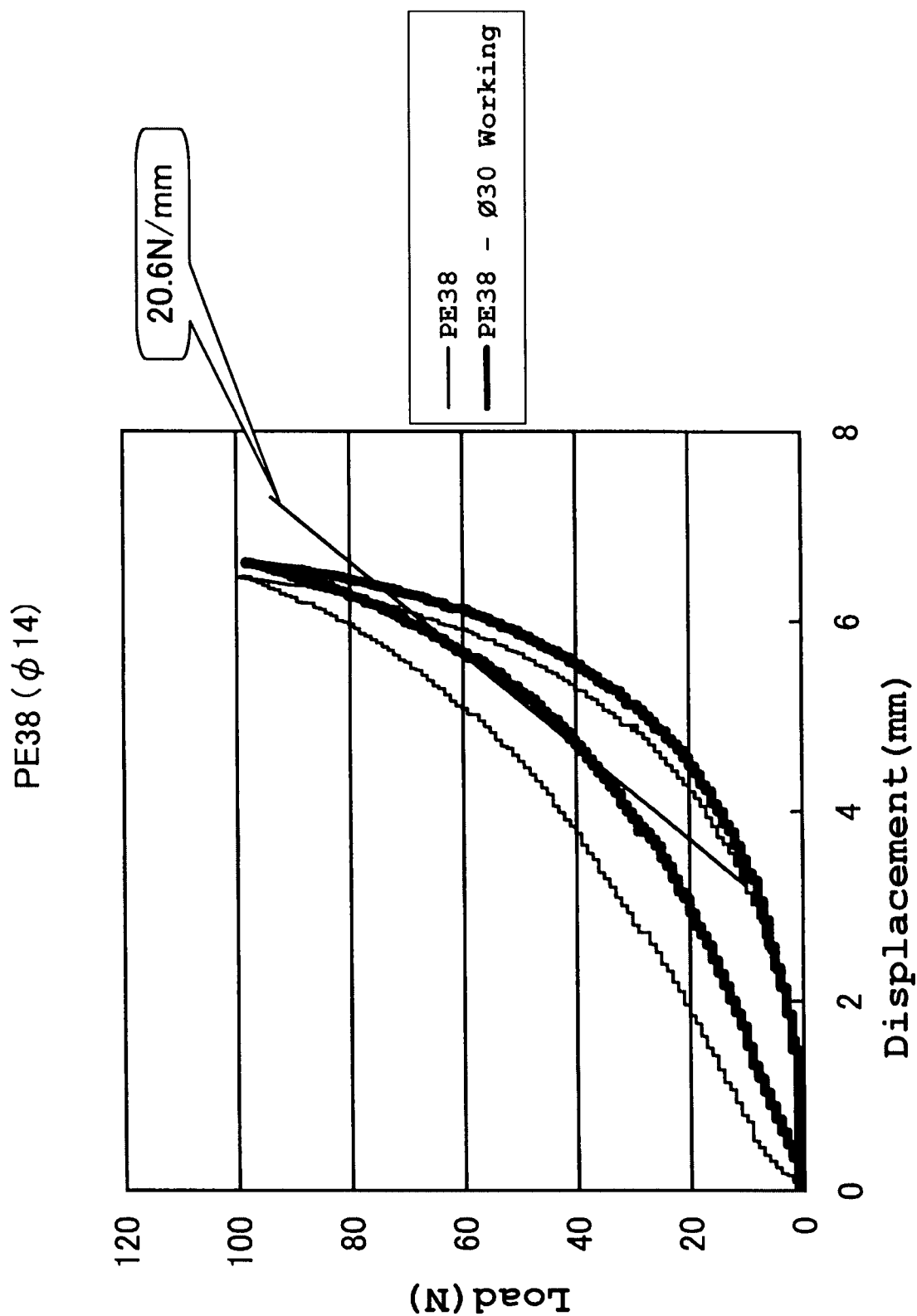
FIG. 12 is a graph showing load-deflection characteristics when a test piece using a polyethylene foam made with a bead method was pressed by a pressing plate having a diameter of 14 mm in Test Example 2.
Figure 13:
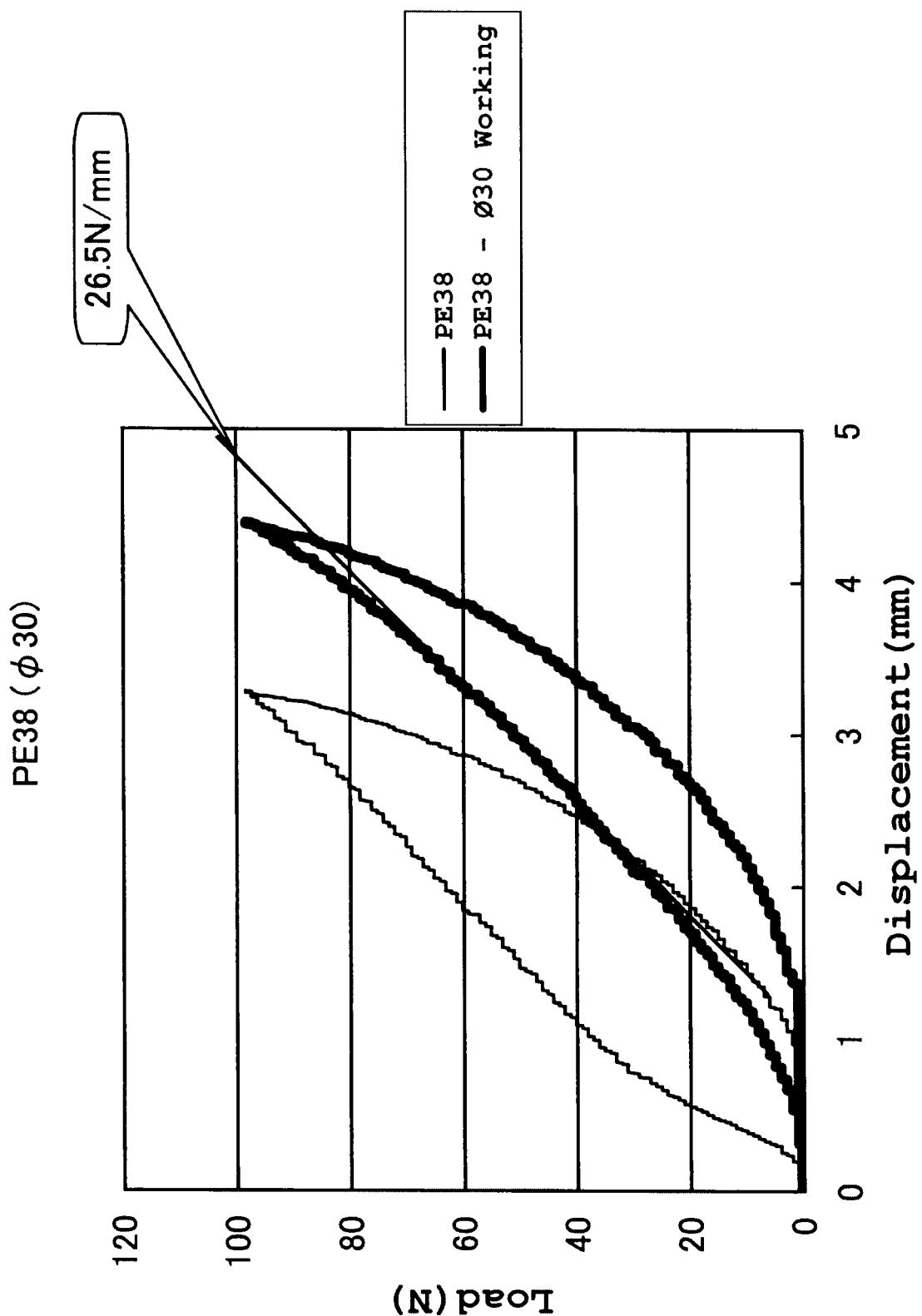
FIG. 13 is a graph showing load-deflection characteristics when a test piece using a polyethylene foam made with a bead method was pressed by a pressing plate having a diameter of 30 mm in Test Example 2.
Figure 14:
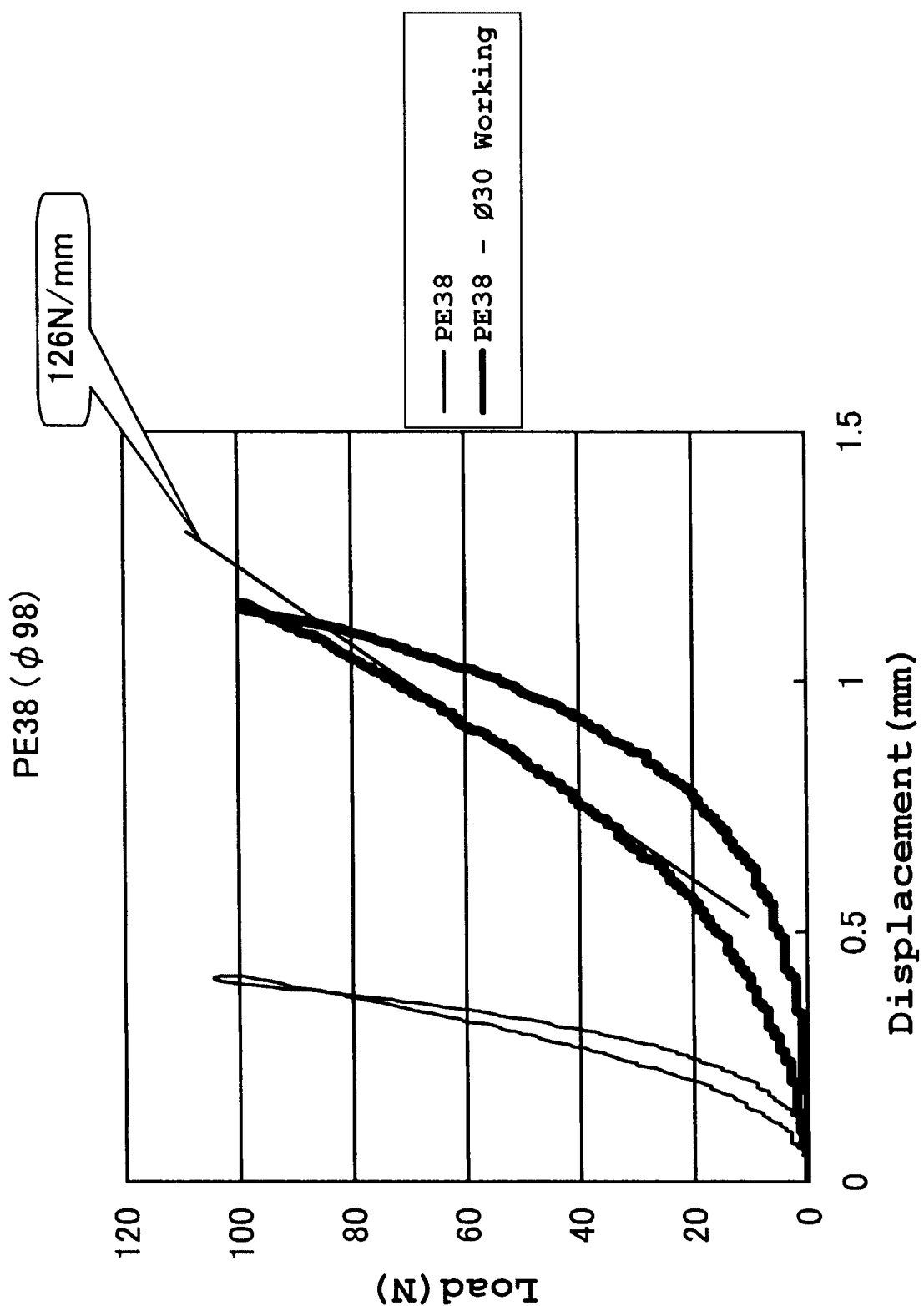
FIG. 14 is a graph showing load-deflection characteristics when a test piece using a polyethylene foam made with a bead method was pressed by a pressing plate having a diameter of 98 mm in Test Example 2.

The respective test pieces were pressed in a thickness direction thereof using a pressing plate and load-deflection characteristics thereof were measured. FIG. 11 is a graph showing the result obtained by pressing the test piece using polystyrene-polyolefin composite resin foam produced by SEKISUI PLASTICS CO., LTD. by using a pressing plate having a diameter of 98 mm, where "PO30" indicates data of the test pieces having no recessed portion formed and "PO30-Ø30 working" indicates data of the test piece having the recessed portions formed. FIG. 12 to FIG. 14 are graphs showing the results obtained by pressing the test pieces using polyethylene foam made with a bead method, produced by KANEKA CORPORATION by using pressing plates having a diameter of 14 mm, a diameter of 30 mm, and a diameter of 98 mm, respectively, where "PE38" indicates data of the test piece having no recessed portions formed and "PE38-Ø30 working" indicates data of the test piece having the recessed portions formed.

From FIG. 11, it is understood that the spring constant of "PO30-Ø30 working" having the recessed portions formed becomes significantly smaller than that of "PO30" having no recessed portion formed. On the other hand, in each of FIG. 12 to FIG. 14, the spring constant of "PE38-Ø30 working" having the recessed portions formed becomes smaller than that of "PE38" having no recessed portions formed. For example, in FIG. 12, both hysteresis loss and dynamic spring constant of the test piece having the recessed portions formed are about half of those of the test piece having no recessed portion formed, and in FIG. 13, both hysteresis loss and dynamic spring constant of the test piece having the recessed portions formed are about ⅔ of those of the test piece having no recessed portion formed. From these facts, it is understood that forming recessed portions can lower the spring constant of an elastic member made of expanded resin beads and various spring characteristics can be provided by adjusting the number of recessed portions to be formed, a depth thereof (the thickness of the recessed portion) or the like.

(Test Piece 3)

Regarding a single expanded bead body, a single three-dimensional solid knitted fabric, and a combination of an expanded bead body, a three-dimensional solid knitted fabric, and an elastic covering material, their static load characteristics were examined.

Respective test pieces are as follows:

(1) Test Piece No. 1

This test piece was obtained by preparing two polypropylene foams made with a bead method (Product Name "Eperan", expansion ratio: 30 times) produced by KANEKA CORPORATION and having a vertical length of 240 mm, a horizontal length of 240 mm, and a thickness of 7 mm and laminating these expanded bead bodies on each other.

(2) Test Piece No. 2

This test piece was a three-dimensional solid knitted fabric (Product Number: 49013D) produced by SUMINOE TEXTILE CO., LTD. and having a thickness of about 13 mm.

(3) Test Piece No. 3

This test piece was obtained by sandwiching a three-dimensional solid knitted fabric (Product Number: 49013D) between two expanded bead bodies identical to Test Piece No. 1 and sticking the knitted fabric thereto.

(4) Test Piece No. 4

This test piece was obtained by making lengthwise and breadthways cuts in the respective expanded bead bodies in Test Piece No. 3 at intervals of 3 cm. As shown in FIG. 9B, however, the cuts were formed such that the respective cuts of the two expanded bead bodies were not in alignment with each other via the three-dimensional solid knitted fabric.

(5) Test Piece No. 5

This test piece was obtained by sticking an elastic covering material (Product Name "Espansione" produced by KB SEIREN, LTD.) having a thickness of about 0.3 mm to an outermost layer of Test Piece No. 4 by using adhesive to cover Test Piece No. 4.

Test Pieces No. 1 to No. 5 were placed on a flat plate and they were pressed by pressing plates having a diameter of 30 mm, a diameter of 98 mm, and a diameter of 200 mm so that load-deflection characteristics thereof were measured. The results are shown in FIG. 15 to FIG. 17.

Figure 15:
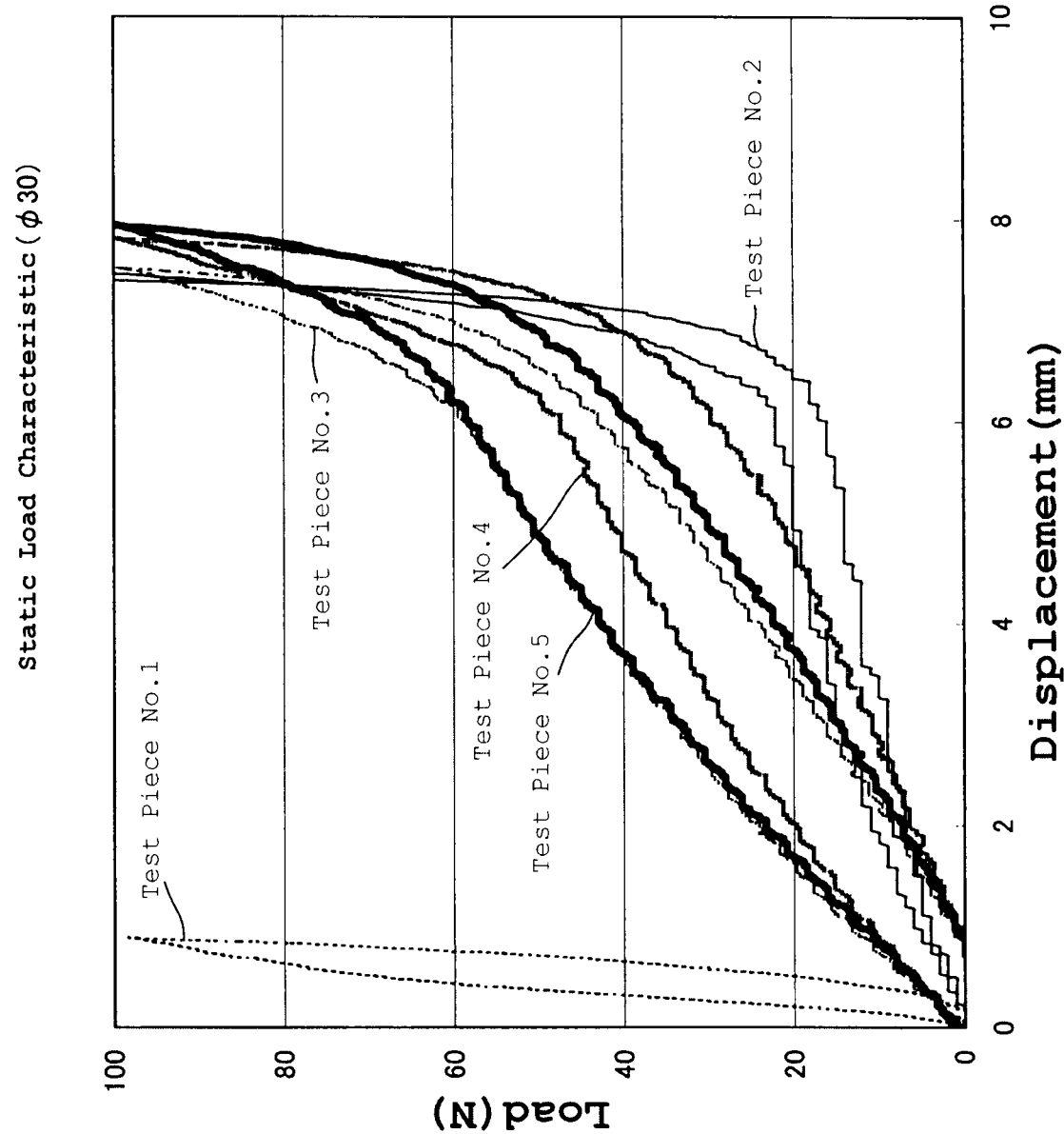
FIG. 15 is a graph showing load-deflection characteristics when test pieces No. 1 to No. 5 were pressed by a pressing plate having a diameter of 30 mm in Test Example 3.

From FIG. 15, it is understood that when pressing is performed by using the pressing plate having a diameter of 30 mm, the expanded bead body (Test Piece No. 1) exhibits very high spring constant, while the three-dimensional solid knitted fabric (Test Piece No. 2) exhibits a very low spring constant. Test Piece No. 3 obtained by laminating the expanded bead body and the three-dimensional solid knitted fabric on each other exhibits an intermediate spring constant between both the very high spring constant and the very low spring constant, but when Test piece No. 3 is used as a cushioning member as it is, a crack or the like occurs in the expanded bead body, as described above. The spring constant of Test Piece No. 4 obtained by making cuts in the expanded bead bodes of Test Piece No. 3 becomes lower than that of Test Piece No. 3, but Test Piece No. 5 obtained by covering Test Piece No. 4 with the elastic covering material is smaller in difference between its spring constant of less than 60 N and its spring constant of 60 N or more than Test Piece No. 4 and a linearity of Test Piece No. 5 becomes stronger than that of Test Piece No. 3. so that bottom contact is hardly felt. Since Test Piece No. 5 has a configuration covered with the elastic covering material, it is suppressed that a crack or the like occurs in the expanded bead body, so that Test Piece No. 5 is suitable as a cushioning member.

Figure 16:
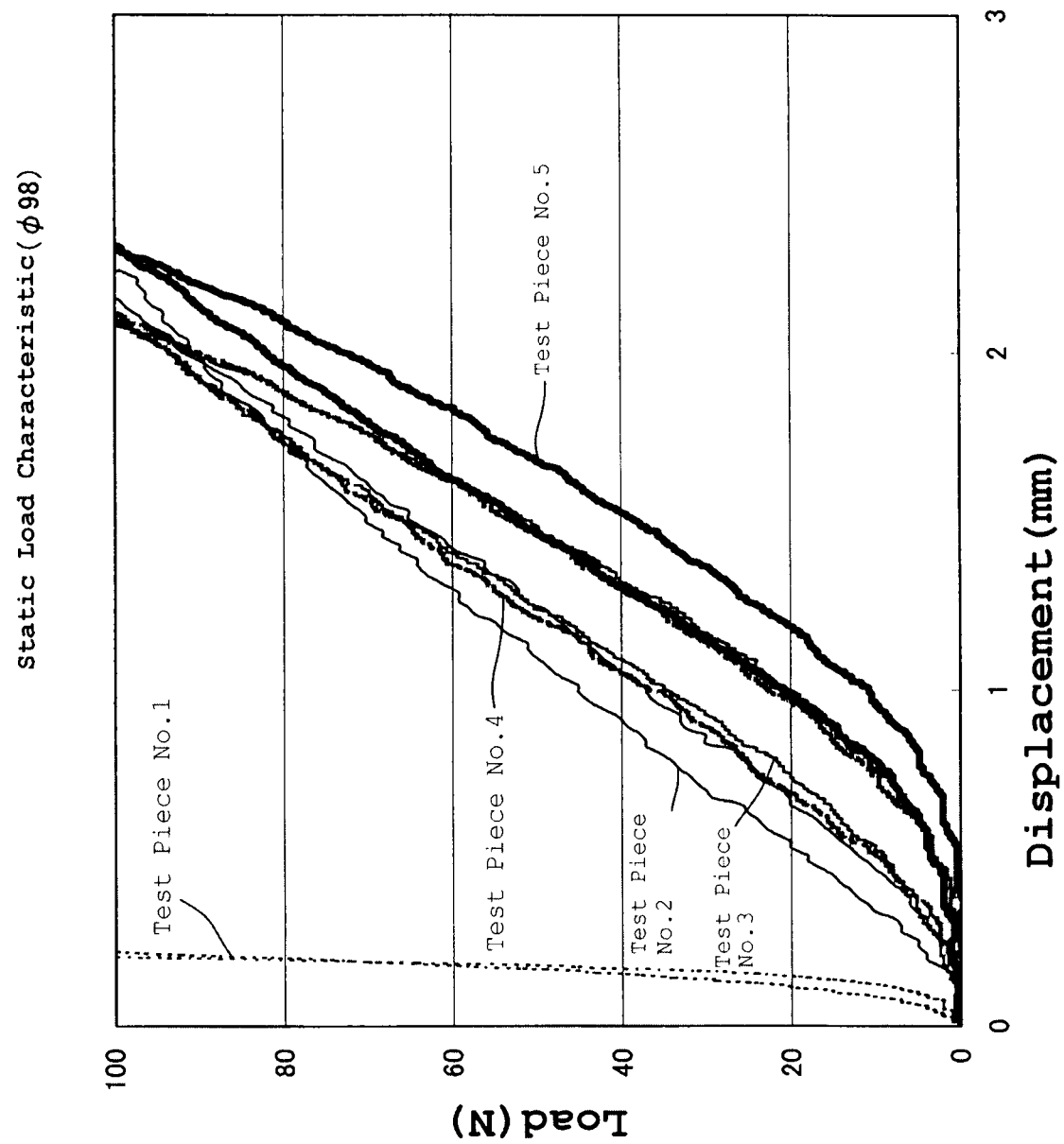
FIG. 16 is a graph showing load-deflection characteristics when test pieces No. 1 to No. 5 were pressed by a pressing plate having a diameter of 98 mm in Test Example 3.

From FIG. 16, the three-dimensional solid knitted fabric (Test Piece No. 2) has such a characteristic that, when it is pressed by a pressing plate having a diameter of 98 mm, the hysteresis loss is lowered so that its linearity becomes high. A tendency approximately similar to the above appears in each of Test Pieces No. 3 to No. 5, but it is understood that the spring constant in a range of an initial load of 10 N or less is significantly low in Test Piece No. 5 having a configuration covered with the elastic covering material. This is because a reaction force easily disperses in a direction of a face of Test Piece No. 5 due to stretching and compressing of the elastic covering material, which makes a person feel it soft. Since the characteristic obtained when pressing is performed by a pressing plate having a diameter of 98 mm corresponds to a person's thigh, when Test Piece No. 5 is used as a cushioning member for a seat structure, high fit can be provided to an seat occupant in an initial stage of his/her seating action, namely, a period of time where the occupant's thigh begins to contact with a surface of the cushioning member.

Figure 17:
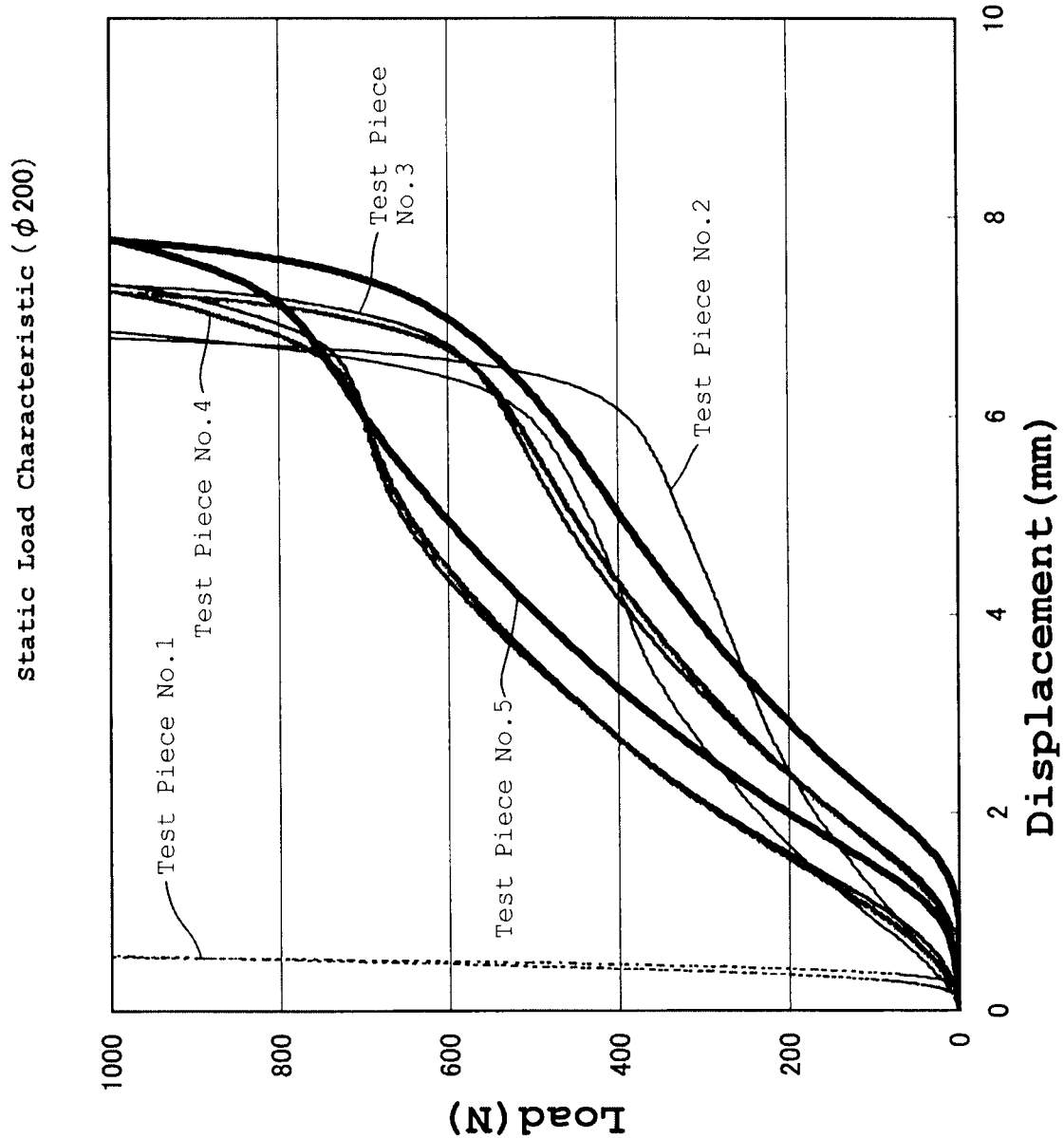
FIG. 17 is a graph showing load-deflection characteristics when test pieces No. 1 to No. 5 were pressed by a pressing plate having a diameter of 20 mm in Test Example 3.

From FIG. 17, when pressing is performed by a pressing plate having a diameter of 200 mm, Test Pieces No. 3 to No. 5 configured as a combination with the expanded bead bodies are stronger in linearity than the three-dimensional solid knitted fabric (Test Piece No. 2). However, Test Piece No. 5 configured as a combination with the elastic covering material has a small difference between its spring constant of 600N or less and its spring constant near 750 N to 800 N, and the linearity of Test Piece No. 5 appears more strongly than those of Test Pieces No. 3 and No. 4, so that it is understood that bottom contact of Test Piece No. 5 is hard to occur. That is, the transition points of the spring constants in Test Pieces No. 2 to Test Piece No. 4 lie in 800 N or less, while the transition point of the spring constant in Test Piece No. 5 lies in 800 N or more. In general, since 20 to 40 percentages of the body weight of a seat occupant are applied to a seat back of a seat while 60 to 80 percentages thereof are applied to a seat cushion of the seat, when Test Piece No. 5 is used, even if a seat occupant having a body weight of 100 kg sits on the seat, he/she feels a spring constant approximately equal to that obtained when a seat occupant having a body weight of 60 kg sits thereon.

TEST EXAMPLE 4

Figure 18:
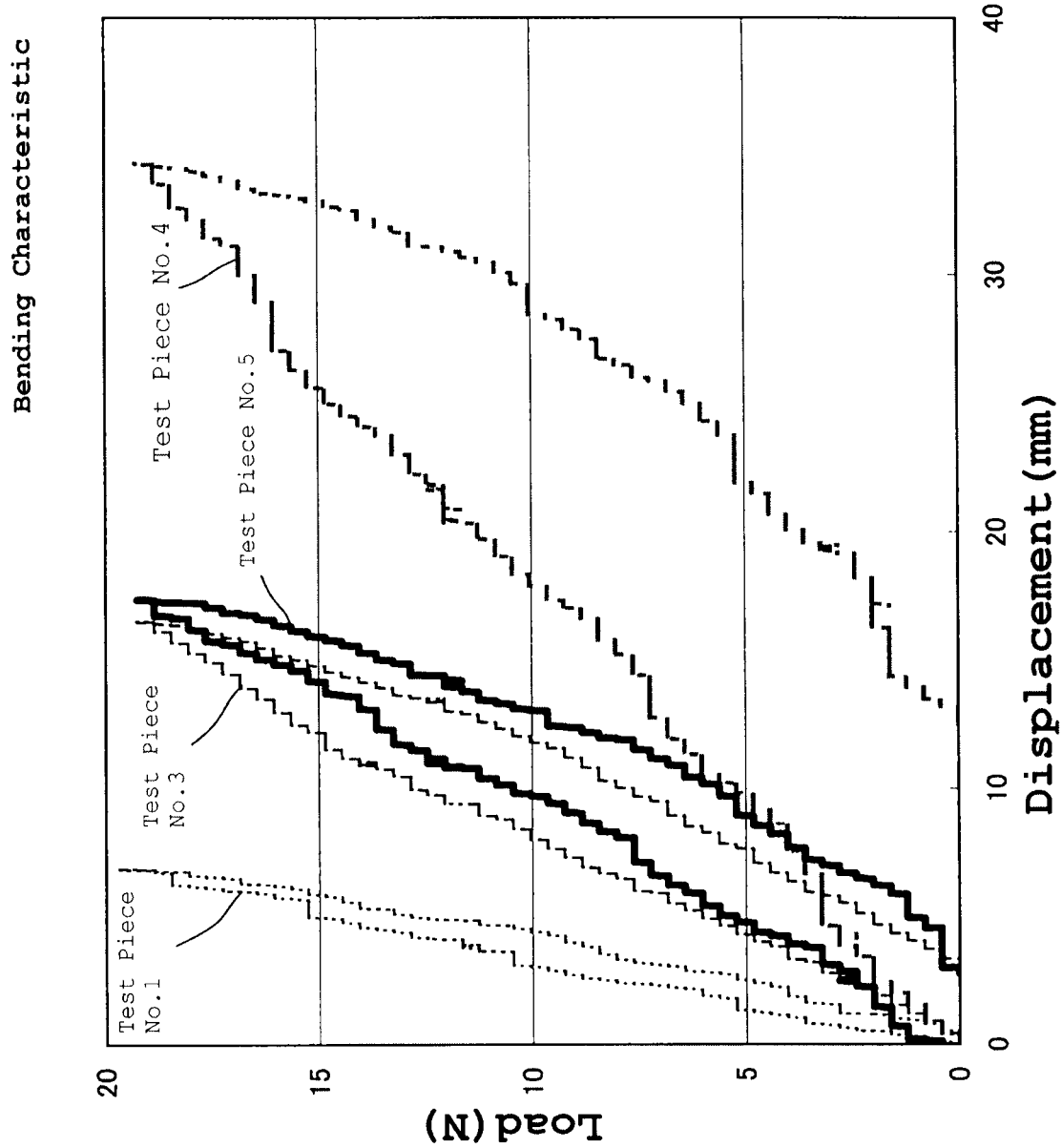
FIG. 18 is a graph showing bending characteristics of test piece No. 1, and test pieces No. 3 to No. 5 in Test Example 4.

Regarding Test Piece No. 1 and Test Pieces No. 3 to No. 5 of Test Example 3, both side portions of the respective test pieces were supported by supporting members, the test pieces were set between the supporting members in a floating manner, they were pressed by using a rod-like pressing jig having a circular distal end face, and bending characteristics of the test pieces were examined. The examination results are shown in FIG. 18.

A single expanded bead body (Test Piece No. 1) exhibited a very high spring constant in the bending characteristics, while the spring constants of Test Pieces No. 3 to No. 5 configured as a combination of the expanded bead bodies and the three-dimensional solid knitted fabric were lowered below that of Test Piece No. 1. The spring constant of Test Piece No. 4 having the configuration where cuts were made in the expanded bead bodies was lowest, but the hysteresis loss thereof was considerably large. On the other hand, Test Piece No. 5 having the combination with the elastic covering material was lower in spring constant than Test Piece No. 3 but it was smaller in hysteresis loss than Test Piece No. 4. Therefore, it is understood that a restoring property of Test Piece No. 5 against bending is also excellent.

The spring constant of Test Piece No. 3 largely depends on the spring constant of the expanded bead body. On the other hand, since Test Piece No. 5 has the expanded bead bodies formed with cuts, dependency on two factors of the spring constant to bending of the three-dimensional solid knitted fabric and an area of the cuts becomes large in Test Piece No. 5. Therefore, since the spring constant to bending of Test Piece 4 having no elastic covering material can be made small by adjusting the kind of three-dimensional solid knitted fabric or the area of the cuts (recessed portions), the spring constant to bending in the state of Test Piece No. 5 having the elastic covering material stuck thereto can be made largely smaller than that of Test Piece No. 3.

That is, the spring characteristic or the bending characteristic to compression load of the elastic member made of expanded resin beads or the laminated elastic structural body can be adjusted variously by using, as the three-dimensional solid knitted fabric to be disposed between the expanded bead bodies, one having a different characteristic or changing the area of the cuts (recessed portions) of the expanded bead bodies.

INDUSTRIAL APPLICABILITY

The elastic member made of expanded resin beads and the laminated elastic structural body of the present invention can be used as a cushioning member for a seat for a vehicle such as an airplane, a train, or an automobile, and the seat structure of the present invention is suitable as a seat for a vehicle. By applying the present invention to not only the vehicle seat but also various seats such as an office seat, weight reduction of such seats can be achieved. Further, besides the seat, the present invention can be used as a cushioning member or the like. For example, the elastic member made of expanded resin beads and the laminated elastic structural body of the present invention can be used as packaging materials configuring a box or a container for packaging various food such as perishable food, precision machinery such as a computer or a mobile phone, valuables such as jewels, or an article of furniture, or buffer materials disposed inside the box or the like.

REFERENCE SIGNS LIST

1: laminated elastic structural body
10: elastic member made of expanded resin beads
10a: expanded bead body
10c: three-dimensional solid knitted fabric
10b: elastic covering material
20: three-dimensional solid knitted fabric
30: flame-resistant cloth
50: cushion pan
100: elastic member made of expanded resin beads
110: expanded bead body
120: elastic covering material
110a, 110b, 110d, 110e: recessed portion
200: three-dimensional solid knitted fabric

The invention claimed is:

1. An elastic member made of expanded resin beads being used as a cushioning member for a seat, comprising:
an expanded bead body; and
an elastic covering material having predetermined stretching properties and stuck to an outer face of the expanded bead body,
wherein recessed portions worked to be reduced in thickness are partially formed in the expanded bead body, and
wherein the elastic covering material comprises elastic fiber unwoven fabric where thermoplastic elastomer elastic fibers are mutually bonded in a melting manner and the elastic covering material has an extension percentage of at least 200% and a recovery rate of at least 80% at 100% extension time, and
wherein the elastic covering material is provided so as to closely contact with the outer face of the expanded bead body.

2. The elastic member made of expanded resin beads according to claim 1,
wherein the elastic covering material is provided so as to closely contact with the outer face of the expanded bead body including respective surfaces of the recessed portions.

3. The elastic member made of expanded resin beads according to claim 1, wherein the elastic covering material is stuck to an outer face of the expanded bead body.

4. The elastic member made of expanded resin beads according to claim 1, wherein at least two layers of the expanded bead bodies are laminated on each other and the elastic covering material is stuck to an outermost face of the at least two layers laminated.

5. The elastic member made of expanded resin beads according to claim 4, wherein another elastic member is disposed into at least one interlayer of the at least two layers of the expanded bead bodies.

6. The elastic member made of expanded resin beads according to claim 5, wherein the another elastic member is a three-dimensional solid knitted fabric having a pair of ground knitted fabrics disposed separately from each other and a lot of connecting strands which are reciprocated between the pair of ground knitted fabrics to connect both the ground knitted fabrics.

7. The elastic member made of expanded resin beads according to claim 2, wherein a through-hole portion extending in a thickness direction is further partially formed in the expanded bead body.

8. The elastic member made of expanded resin beads according to claim 1, wherein the expanded bead body is an expanded formation body made with a bead method of resin containing at least one of polystyrene, polypropylene, and polyethylene.

9. A laminated elastic structural body configured by laminating the elastic member made of expanded resin beads on another elastic member according to claim 1 on another elastic member.

10. The laminated elastic structural body according to claim 9, wherein the another elastic member is a three-dimensional solid knitted fabric having a pair of ground knitted fabrics disposed separately from each other and a lot of connecting strands which are reciprocated between the pair of ground knitted fabrics to connect both the ground knitted fabrics.

11. The laminated elastic structural body according to claim 9, wherein a plurality of layers of the elastic members made of expanded resin beads is provided via the another elastic member, and portions worked to be reduced in thickness or through-hole portions extending in a thickness direction, the portions or the through-hole portions being formed in the expanded bead bodies of the elastic members made of expanded resin beads in the respective layers, are formed at positions approximately coincident with each other or different from each other.

12. The laminated elastic structural body according to claim 9, further comprising a flame-resistant cloth laminated.

13. A seat structure provided with a cushion pan and a cushioning member set on the cushion pan, wherein
   the elastic member made of expanded resin beads according claim 1 is used as the cushioning member, and
   the cushion pan is provided with pan frames configuring two layers having a space therebetween.

14. A seat structure provided with a cushion pan and a cushioning member set on the cushion pan, wherein
   the laminated elastic structural body according to claim 9 is used as the cushioning member, and
   the cushion pan is provided with pan frames configuring two layers having a space therebetween.

\* \* \* \* \*